United States Patent
Ikoshi et al.

(10) Patent No.: US 12,305,058 B2
(45) Date of Patent: May 20, 2025

(54) OVERCOAT LIQUID FOR INKJET TEXTILE PRINTING, INK SET FOR INKJET TEXTILE PRINTING, AND INKJET TEXTILE PRINTING METHOD

(71) Applicant: FUJIFILM Corporation, Tokyo (JP)

(72) Inventors: Masao Ikoshi, Kanagawa (JP); Ryoichi Nakano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 844 days.

(21) Appl. No.: 17/467,263

(22) Filed: Sep. 5, 2021

(65) Prior Publication Data

US 2021/0395553 A1 Dec. 23, 2021

Related U.S. Application Data

(63) Continuation of application No. PCT/JP2019/041991, filed on Oct. 25, 2019.

(30) Foreign Application Priority Data

Mar. 29, 2019 (JP) ................................ 2019-067569

(51) Int. Cl.
C09D 11/54 (2014.01)
C09D 11/322 (2014.01)
C09D 11/38 (2014.01)

(52) U.S. Cl.
CPC ............ C09D 11/54 (2013.01); C09D 11/322 (2013.01); C09D 11/38 (2013.01)

(58) Field of Classification Search
CPC ....... C09D 11/54; C09D 11/322; C09D 11/38; C09D 11/102; C09D 11/12; C09D 11/40; B41J 2/01; B41M 5/00; D06P 5/08; D06P 5/30
See application file for complete search history.

(56) References Cited

U.S. PATENT DOCUMENTS

| | | | |
|---|---|---|---|
| 8,348,412 B2 | 1/2013 | Hildebrand et al. | |
| 9,783,700 B2 | 10/2017 | Tamai et al. | |
| 2011/0285781 A1 | 11/2011 | Hildebrand et al. | |
| 2015/0259567 A1* | 9/2015 | Tamai | C09D 11/40 347/21 |
| 2018/0072073 A1* | 3/2018 | Makuta | C09D 11/033 |
| 2018/0237650 A1 | 8/2018 | Oriakhi et al. | |
| 2018/0305863 A1 | 10/2018 | Dimotakis et al. | |
| 2019/0291471 A1* | 9/2019 | Ohta | B41M 7/00 |
| 2020/0207141 A1* | 7/2020 | Seguchi | B41J 2/04581 |

FOREIGN PATENT DOCUMENTS

| | | | |
|---|---|---|---|
| CN | 102257074 | | 11/2011 |
| CN | 107001830 | | 8/2017 |
| JP | 2012515817 | | 7/2012 |
| JP | 2013221141 | | 10/2013 |
| JP | 2015172124 | | 10/2015 |
| JP | 2015182348 | | 10/2015 |
| JP | 2016193980 A | * | 11/2016 |
| JP | 2017149812 | | 8/2017 |
| JP | 2017149812 A | * | 8/2017 |
| JP | 2017206644 | | 11/2017 |
| JP | 2018123235 | | 8/2018 |
| JP | 2019501043 | | 1/2019 |
| WO | 2016092309 | | 6/2016 |

OTHER PUBLICATIONS

English machine translation of JP-2016193980-A (Year: 2016).*
English machine translation of JP-2017149812-A (Year: 2017).*
"International Search Report (Form PCT/ISA/210) of PCT/JP2019/041991," mailed on Dec. 24, 2019, with English translation thereof, pp. 1-4.
"Written Opinion of the International Searching Authority (Form PCT/ISA/237)" of PCT/JP2019/041991, mailed on Dec. 24, 2019, with English translation thereof, pp. 1-10.
"Office Action of Japan Counterpart Application", issued on Sep. 27, 2022, with English translation thereof, p. 1-p. 5.
"Office Action of China Counterpart Application", issued on Jan. 3, 2023, with English translation thereof, p. 1-p. 15.

* cited by examiner

*Primary Examiner* — Jennifer A Smith
*Assistant Examiner* — Jeffrey Eugene Barzach
(74) *Attorney, Agent, or Firm* — JCIPRNET

(57) ABSTRACT

Provided are: an overcoat liquid for inkjet textile printing including particles of an anionic polyurethane, particles of a wax, a water-soluble organic solvent, and water, wherein the content of the particles of the anionic polyurethane is 4 mass % to 20 mass % relative to the total amount of the overcoat liquid, the content of the particles of the wax is 0.1 mass % to 3 mass % relative to the total amount of the overcoat liquid, and the content of the water-soluble organic solvent satisfies formula (1) in units of mass %, an ink set for inkjet textile printing; and an inkjet textile printing method.

$$0.7 \times A + 0.8 \times B + C < 20 \quad (1)$$

See the specification for definitions of A, B, and C.

13 Claims, No Drawings

OVERCOAT LIQUID FOR INKJET TEXTILE PRINTING, INK SET FOR INKJET TEXTILE PRINTING, AND INKJET TEXTILE PRINTING METHOD

CROSS-REFERENCE TO RELATED APPLICATION

This application is a Continuation of International Application No. PCT/JP2019/041991, filed Oct. 25, 2019, which claims priority to Japanese Patent Application No. 2019-067569 filed Mar. 29, 2019. Each of the above applications is hereby expressly incorporated by reference, in its entirety, into the present application.

BACKGROUND OF THE INVENTION

1. Field of the Invention

The present disclosure relates to an overcoat liquid for inkjet textile printing, an ink set for inkjet textile printing, and an inkjet textile printing method.

2. Description of the Related Art

In the related art, a screen printing method has been often used as a method for coloring a fabric. In recent years, as the demand for small-lot production of multiple models increases, the transition from a screen printing method to an inkjet recording method has progressed from the viewpoint of cost.

However, fabrics colored with ink by an inkjet recording method are color-transferred or color-faded by rubbing, that is, have low rubbing fastness as compared with fabrics colored by a known screen printing method. In particular, the rubbing fastness in a wet state (hereafter referred to as "wet rubbing fastness") that is assumed in a case of wetting with sweat or rain is low. When various components are added to an ink, the rubbing fastness is improved to some extent, but the storage stability and ejection property of the ink tend to decrease. Furthermore, the texture of a fabric tends to deteriorate, which has required further studies.

A method for applying an overcoat liquid (also referred to as a "post-treatment liquid") to the surface of an image that has been formed by jetting an ink is known as a method for improving the rubbing fastness of fabrics colored with ink. For example, JP2017-149812A discloses an overcoat liquid for textile printing that includes a water-dispersible resin, a water-soluble organic solvent having a plurality of hydroxy groups in its molecular structure, a crosslinkable component, and water. JP2017-206644A discloses a post-treatment liquid including resin particles constituted by urethane resin particles and/or acrylic resin particles, an organic solvent, and water. JP2015-172124A discloses an overcoat liquid including a water-dispersible polyurethane, a particular fluorine-based surfactant, a particular diol, and water.

SUMMARY OF THE INVENTION

In JP2017-149812A, the rubbing fastness is improved by increasing the amount of the overcoat liquid applied, but coexistence of the rubbing fastness with the texture of a fabric is not yet sufficient. In JP2017-206644A and JP2015-172124A, the rubbing fastness in a dry state (hereafter referred to as "dry rubbing fastness") is improved, but improvement of wet rubbing fastness is not studied. In general, wet rubbing fastness tends to readily deteriorate compared with dry rubbing fastness. Furthermore, the overcoat liquids disclosed in JP2017-206644A and JP2015-172124A are not limited to those for textile printing, and no attention is paid to the change in texture of a fabric caused by application of the overcoat liquid.

The present disclosure has been made in view of such circumstances. According to an embodiment of the present invention, there are provided an overcoat liquid for inkjet textile printing capable of improving dry rubbing fastness and wet rubbing fastness while the texture of a fabric is maintained, an ink set for inkjet textile printing, and an inkjet textile printing method.

Specific means for achieving the above object is as follows.

<1> An overcoat liquid for inkjet textile printing includes particles of an anionic polyurethane, particles of a wax, a water-soluble organic solvent, and water. A content of the particles of the anionic polyurethane is 4 mass % to 20 mass % relative to a total amount of the overcoat liquid. A content of the particles of the wax is 0.1 mass % to 3 mass % relative to the total amount of the overcoat liquid. A content of the water-soluble organic solvent satisfies formula (1) in units of mass %.

$$0.7 \times A + 0.8 \times B + C < 20 \tag{1}$$

A: a content of a water-soluble organic solvent having a boiling point of 200° C. or lower relative to the total amount of the overcoat liquid B: a content of a water-soluble organic solvent having a boiling point of higher than 200° C. and 250° C. or lower relative to the total amount of the overcoat liquid C: a content of a water-soluble organic solvent having a boiling point of higher than 250° C. relative to the total amount of the overcoat liquid <2> In the overcoat liquid for inkjet textile printing according to <1>, the anionic polyurethane has a carboxy group.

<3> In the overcoat liquid for inkjet textile printing according to <1> or <2>, the anionic polyurethane has a carbonate structure.

<4> In the overcoat liquid for inkjet textile printing according to any one of <1> to <3>, the wax is a polyethylene wax.

<5> In the overcoat liquid for inkjet textile printing according to any one of <1> to <4>, the water-soluble organic solvent is a glycol.

<6> In the overcoat liquid for inkjet textile printing according to any one of <1> to <5>, a ratio of the content of the particles of the anionic polyurethane to the content of the particles of the wax is 2 to 50 on a mass basis.

<7> The overcoat liquid for inkjet textile printing according to any one of <1> to <6> further includes a crosslinking agent.

<8> In the overcoat liquid for inkjet textile printing according to <7>, the crosslinking agent is a blocked isocyanate.

<9> The overcoat liquid for inkjet textile printing according to any one of <1> to <8> further includes, as a thickener, a polyethylene glycol having a weight-average molecular weight of 4000 or more, or a block polymer constituted by a polyethylene glycol and a polypropylene glycol that have a weight-average molecular weight of 4000 or more.

<10> In the overcoat liquid for inkjet textile printing according to <9>, a content of the thickener is 0.01 mass % to 2 mass % relative to the total amount of the overcoat liquid.

<11> An ink set for inkjet textile printing includes the overcoat liquid for inkjet textile printing according to any one of <1> to <10> and a color ink.

<12> An inkjet textile printing method has a first step of jetting a color ink onto a fabric by an inkjet recording method and a second step of jetting, by an inkjet recording method, the overcoat liquid according to any one of <1> to <10> onto the fabric onto which the color ink has been jetted.

<13> In the inkjet textile printing method according to <12>, in the second step, the overcoat liquid for inkjet textile printing is jetted using an inkjet recording apparatus having a liquid circulation mechanism configured to circulate the overcoat liquid for inkjet textile printing between a liquid tank and an inkjet head.

<14> In the inkjet textile printing method according to <12> or <13>, in the second step, the overcoat liquid for inkjet textile printing is jetted by a single pass system.

The present disclosure can provide an overcoat liquid for inkjet textile printing capable of improving dry rubbing fastness and wet rubbing fastness while the texture of a fabric is maintained, an ink set for inkjet textile printing, and an inkjet textile printing method.

DESCRIPTION OF THE PREFERRED EMBODIMENTS

Hereafter, the overcoat liquid for inkjet textile printing, the ink set for inkjet textile printing, and the inkjet textile printing method according to embodiments of the present disclosure will be described in detail.

In this specification, every numerical range expressed using "to" means a range including numerical values before and after "to" as the minimum and maximum values.

When numerical ranges are described stepwise in this specification, the upper limit or the lower limit of a certain numerical range may be replaced with an upper limit or a lower limit of a different numerical range also described stepwise. In numerical ranges described in this specification, the upper limit or the lower limit of a certain numerical range may be replaced with values described in Examples.

In this specification, when a plurality of substances corresponding to each component are present in a composition, the amount of each component in the composition means a total amount of the plurality of substances that are present in the composition unless otherwise specified.

In this specification, combinations of two or more preferred embodiments are more preferable embodiments.

In this specification, the term "step" refers to not only an independent step, but also a step that cannot be clearly distinguished from another step but achieves the intended result of the step.

In this specification, when simply described as "rubbing fastness", the rubbing fastness indicates both dry rubbing fastness and wet rubbing fastness.

Overcoat Liquid for Inkjet Textile Printing

The overcoat liquid for inkjet textile printing (hereafter simply referred to as an "overcoat liquid") according to an embodiment of the present disclosure includes particles of an anionic polyurethane, particles of a wax, a water-soluble organic solvent, and water. The content of the particles of the anionic polyurethane is 4 mass % to 20 mass % relative to the total amount of the overcoat liquid. The content of the particles of the wax is 0.1 mass % to 3 mass % relative to the total amount of the overcoat liquid. The content of the water-soluble organic solvent satisfies formula (1) below in units of mass %.

$$0.7 \times A + 0.8 \times B + C < 20 \qquad (1)$$

A: the content of a water-soluble organic solvent having a boiling point of 200° C. or lower relative to the total amount of the overcoat liquid B: the content of a water-soluble organic solvent having a boiling point of higher than 200° C. and 250° C. or lower relative to the total amount of the overcoat liquid C: the content of a water-soluble organic solvent having a boiling point of higher than 250° C. relative to the total amount of the overcoat liquid The overcoat liquid according to an embodiment of the present disclosure is used for inkjet textile printing. That is, the overcoat liquid according to an embodiment of the present disclosure is used when textile printing is performed on a fabric, and is applied by an inkjet recording method. Specifically, after an ink image is recorded on a fabric using a color ink, the overcoat liquid is applied onto the fabric on which the image has been recorded. After the overcoat liquid is applied, the water-soluble organic solvent and water in the overcoat liquid evaporate while penetrating into the fabric. Then, a film formed of a solid content in the overcoat liquid is formed on the fabric on which the image has been recorded.

In the present disclosure, the overcoat liquid includes a predetermined amount of anionic polyurethane particles. Since polyurethane has flexibility, a flexible film can be formed by applying the overcoat liquid onto the ink image. Since such a flexible film is less likely to be peeled off by rubbing, application of the overcoat liquid according to an embodiment of the present disclosure on the ink image improves rubbing fastness, in particular, wet rubbing fastness. Furthermore, such a flexible film is formed so as to follow the surface shape of the fabric and the surface shape of the fabric on which the ink image has been recorded, and thus the texture of the fabric can be maintained. In the present disclosure, rubbing fastness, in particular, dry rubbing fastness is improved by combining a predetermined amount of anionic polyurethane particles with a predetermined amount of wax particles. This is probably because the combination of the anionic polyurethane particles and the wax particles allows formation of a film having both flexibility and strength and reduction in the friction coefficient of the film surface. In the present disclosure, when the content of the water-soluble organic solvent satisfies the above formula (1), the rubbing fastness is improved. The present inventors have conducted various studies based on the finding that poor drying of the water-soluble organic solvent included in the overcoat liquid causes deterioration of rubbing fastness. As a result, the present inventors have derived the above formula (1). In order to avoid poor drying, the content of the water-soluble organic solvent is not simply reduced, but the upper limit of the content is set depending on the boiling points of water-soluble organic solvents.

Hereafter, each component included in the overcoat liquid according to an embodiment of the present disclosure will be described.

Anionic Polyurethane Particles

The overcoat liquid according to an embodiment of the present disclosure includes anionic polyurethane particles. The anionic polyurethane is a polyurethane having an anionic group. Examples of the anionic group include a carboxy group, a sulfonic acid group, and a phosphonic acid group. In particular, a carboxy group is preferable. In the present disclosure, the anionic polyurethane is preferably a self-emulsifying polymer. The "self-emulsifying polymer" means a polymer that can be dispersed in an aqueous medium by a functional group (an anionic group in the present disclosure) of the polymer itself without using an emulsifier.

The anionic polyurethane is preferably used in the form of a dispersion liquid in which the anionic polyurethane is dispersed in water from the viewpoint of ease of preparation of the overcoat liquid. By dispersing the anionic polyurethane in advance, aggregation with other components included in the overcoat liquid can be suppressed, and storage stability can be improved. The concentration of the dispersion liquid in which the anionic polyurethane is dispersed in water is not particularly limited, and is, for example, 20 mass % to 60 mass %.

The anionic polyurethane is present in the overcoat liquid in the form of particles. For the particle size of the anionic polyurethane, the volume-average particle size is preferably 0.4 µm or less, more preferably 0.01 µm to 0.3 µm, and further preferably 0.02 µm to 0.2 µm. The particle size is determined by measuring a volume-average particle size by a dynamic light scattering method using a Nanotrac particle size distribution analyzer (product name "UPA-EX150", manufactured by Nikkiso Co., Ltd.).

The polyurethane can be produced by a publicly known method using a polyisocyanate, a polyol, and optionally other components as raw materials. For example, a polyurethane having a carboxy group can be produced by using a polyol having a carboxy group.

In general, polyurethanes are classified into polyether-based polyurethanes, polyester-based polyurethanes, polycarbonate-based polyurethanes, and the like depending on the type of polyol used as a raw material. The polyether-based polyurethane is a polyurethane having an ether structure in its molecule, and can be produced by using a polyether polyol as a raw material. The polyester-based polyurethane is a polyurethane having an ester structure in its molecule, and can be produced by using a polyester polyol as a raw material. The polycarbonate-based polyurethane is a polyurethane having a carbonate structure in its molecule, and can be produced by using a polycarbonate polyol as a raw material.

In the present disclosure, the anionic polyurethane is preferably a polycarbonate-based polyurethane, that is, preferably has a carbonate structure in its molecule. The polycarbonate-based polyurethane is physically harder than polyether-based polyurethanes and polyester-based polyurethanes, and can form a film having excellent water resistance. Thus, the wet rubbing fastness can be improved.

The anionic polyurethane particles may be commercially available products. Examples of the commercially available products include Acrit WBR-016U and WBR-2101 manufactured by Taisei Fine Chemical Co., Ltd.; PUE-921B, PUE-800, and PUE-435A manufactured by Murayama Chemical Laboratory Co., Ltd.; Superflex 126, Superflex 130, Superflex 150, Superflex 150HS, Superflex 170, Superflex 210, Superflex 420, Superflex 420NS, Superflex 460, Superflex 460S, and Superflex 470 manufactured by DKS Co., Ltd.; Neotan UE-1100 manufactured by Toagosei Co., Ltd.; Ucoat UX-485, Ucoat UWS-145, Permarin UA-368T, Permarin UA-200, and Uprene UXA-307 manufactured by Sanyo Chemical Industries, Ltd.; and NeoRez R-4000, NeoRez R-600, and NeoRez R-650 manufactured by DMS Coating Resins Co., Ltd.

The content of the anionic polyurethane particles is 4 mass % to 20 mass %, preferably 6 mass % to 15 mass %, and more preferably 7 mass % to 12 mass % relative to the total amount of the overcoat liquid. When the content of the anionic polyurethane particles is 4 mass % or more, the rubbing fastness is improved. When the content of the anionic polyurethane particles is 20 mass % or less, the texture of the fabric is maintained, and high storage stability of the overcoat liquid is achieved.

The weight-average molecular weight (Mw) of the anionic polyurethane is more preferably 5000 or more and further preferably 10,000 or more from the viewpoint of improving the rubbing fastness. The weight-average molecular weight (Mw) of the anionic polyurethane is measured by gel permeation chromatography (GPC). The GPC is performed with HLC-8220GPC (manufactured by Tosoh Corporation) using three columns of TSKgeL Super HZM-H, TSKgeL Super HZ4000, and TSKgeL Super HZ2000 (manufactured by Tosoh Corporation, 4.6 mmID× 15 cm) and N-methylpyrrolidone as an eluant. The weight-average molecular weight (Mw) is calculated in terms of polystyrene.

Wax Particles

The overcoat liquid according to an embodiment of the present disclosure includes wax particles. In this specification, the wax refers to a polymer having a melting point of 170° C. or lower. The melting point refers to a temperature at the top of an endothermic peak measured using a differential scanning calorimeter (DSC: Differential scanning calorimetry) such as a differential scanning calorimeter (product name "EXSTAR 6220", manufactured by Hitachi High-Tech Science Corporation).

Examples of the wax include vegetable waxes such as carnauba wax, candelilla wax, and rice wax; animal waxes such as beeswax and lanolin; petroleum waxes such as paraffin wax, microcrystalline wax, and petrolatum; mineral waxes such as montan wax and ozokerite; and synthetic waxes such as polyethylene wax, oxidized polyethylene wax, polyolefin wax, stearamide, and α-olefin/maleic anhydride copolymers. In particular, the wax is preferably a polyethylene wax from the viewpoint of further improving the dry rubbing fastness. These waxes may be used alone or in combination of two or more.

The wax particles may be commercially available products. Examples of the commercially available products include Hitec E-6314 and Hitec E-9015 manufactured by Toho Chemical Industry Co., Ltd., Nopcote PEM17 manufactured by San Nopco Limited, Chemipearl (registered trademark) W4005 manufactured by Mitsui Chemicals, Inc., AQUACER 515, AQUACER 552, and AQUACER 593 manufactured by BYK Japan KK, and Selosol 524 manufactured by Chukyo Yushi Co., Ltd.

The content of the wax particles is 0.1 mass % to 3 mass % and preferably 0.5 mass % to 2 mass % relative to the total amount of the overcoat liquid. When the content of the wax particles is 0.1 mass % or more, the dry rubbing fastness is improved. When the content of the wax particles is 3 mass % or less, the wet rubbing fastness is improved and high storage stability of the overcoat liquid is achieved. If the content of the wax particles is excessively increased, the ejection property deteriorates, which may deteriorate the wet rubbing fastness. Upon ejection of the overcoat liquid, if there is ejection failure in which the amount of the overcoat liquid jetted is smaller than that of the overcoat liquid to be jetted, an ink image is sometimes not sufficiently covered with a film formed of the overcoat liquid. If the ink image is not sufficiently covered with the film formed of the overcoat liquid, the ink image is easily peeled off by rubbing, which may deteriorate the wet rubbing fastness.

The ratio of the content of the anionic polyurethane particles to the content of the wax particles is preferably 2 to 50, more preferably 5 to 30, and further preferably 7 to 20 on a mass basis. When the ratio is 2 or more, the storage stability tends to be good. When the ratio is 50 or less, the friction coefficient on the surface of the film formed of the overcoat liquid decreases, and the dry rubbing fastness tends to improve.

The wax is preferably used in the form of a dispersion liquid in which the wax is dispersed in water. By dispersing the wax in advance, aggregation with other components included in the overcoat liquid can be suppressed, and storage stability can be improved. The concentration of the dispersion liquid in which the wax is dispersed in water is not particularly limited, and is, for example, 20 mass % to 60 mass %. The emulsifier for dispersing the wax may be a publicly known emulsifier.

The wax is present in the overcoat liquid in the form of particles. The particle size of the wax is preferably 0.3 μm or less, more preferably 0.01 μm to 0.2 μm, and further preferably 0.02 μm to 0.15 μm in terms of volume-average particle size from the viewpoint of ejection property. The particle size is determined by measuring a volume-average particle size by a dynamic light scattering method using a Nanotrac particle size distribution analyzer (product name "UPA-EX150", manufactured by Nikkiso Co., Ltd.).

The weight-average molecular weight (Mw) of the wax is preferably 300 to 4000 and more preferably 500 to 3000. The weight-average molecular weight (Mw) of the wax is measured by gel permeation chromatography (GPC). The GPC is performed with HLC-8220GPC (manufactured by Tosoh Corporation) using three columns of TSKgeL Super HZM-H, TSKgeL Super HZ4000, and TSKgeL Super HZ2000 (manufactured by Tosoh Corporation, 4.6 mmID× 15 cm) and N-methylpyrrolidone as an eluant. The weight-average molecular weight (Mw) is calculated in terms of polystyrene.

Water-Soluble Organic Solvent

The overcoat liquid according to an embodiment of the present disclosure includes a water-soluble organic solvent (hereafter simply referred to as an "organic solvent"). The term "water-soluble" means that when the target organic solvent is dissolved in 100 g of water at 25° C., the amount of the organic solvent dissolved is 100 g or more.

The organic solvent may be a publicly known organic solvent, and a single organic solvent may be used alone or two or more organic solvents may be used in combination. For example, the organic solvent may be only an organic solvent A described later or a mixture of an organic solvent A, an organic solvent B, and an organic solvent C.

In the present disclosure, the content of the organic solvent satisfies formula (1) below.

$$0.7 \times A + 0.8 \times B + C < 20 \quad (1)$$

A: the content (mass %) of an organic solvent having a boiling point of 200° C. or lower relative to the total amount of the overcoat liquid B: the content (mass %) of an organic solvent having a boiling point of higher than 200° C. and 250° C. or lower relative to the total amount of the overcoat liquid C: the content (mass %) of an organic solvent having a boiling point of higher than 250° C. relative to the total amount of the overcoat liquid The lower limit of "$0.7 \times A + 0.8 \times B + C$" in the formula (1) is preferably 5, more preferably 10, and further preferably 12.

The reason why the content of the organic solvent is set as represented by the formula (1) will be described below. An organic solvent having a boiling point of 200° C. or lower is referred to as an organic solvent A, an organic solvent having a boiling point of higher than 200° C. and 250° C. or lower is referred to as an organic solvent B, and an organic solvent having a boiling point of higher than 250° C. is referred to as an organic solvent C. The boiling point of the organic solvent can be measured with a boiling point measuring instrument such as product name "Dosa Therm 300" manufactured by Titan Technologies, K.K.

The boiling point means a boiling point at 1 atm (101325 Pa).

The base member (fabric) for textile printing is thicker than paper and can hold a larger amount of water and an organic solvent. Therefore, the base member is more advantageous than paper from the viewpoint of drying property. However, since the overcoat liquid is jetted onto an ink image after the ink image is recorded on the base member, the organic solvent included in the overcoat liquid does not readily permeate into the base member and does not readily volatilize. In other words, the organic solvent included in the overcoat liquid is not easily dried compared with the ink directly jetted onto the base member. In particular, when an organic solvent having a high boiling point is used, the overcoat liquid is not easily dried. The organic solvent included in the overcoat liquid penetrates into the ink image, and the ink image becomes wet with the organic solvent, which is in a brittle state. For an ink image which is not sufficiently dried, there is a high possibility that a part of the ink image is scraped off by rubbing and color transfer occurs. Based on these phenomena, a model experiment was performed to examine the relationship between the amount of the organic solvent derived from the overcoat liquid and applied to the ink image and the drying property. As a result, it was found that when the amounts of the organic solvents A, B, and C applied to the base member were respectively 5.7 g/m² or more, 5 g/m² or more, and 4 g/m² or more, the rubbing fastness deteriorated because of poor drying. It is assumed that the overcoat liquid is jetted onto the ink image in a maximum amount of 20 g/m². Therefore, in order to suppress the deterioration of the rubbing fastness, the upper limit of the amount of each of the organic solvent A, the organic solvent B, and the organic solvent C included in the overcoat liquid was determined based on the results of the model experiment. Specifically, the upper limits of the individual contents of the organic solvent A, the organic solvent B, and the organic solvent C included alone were determined to be about 29 mass %, about 25 mass %, and about 20 mass %, respectively, with respect to the total amount of the overcoat liquid. Based on these values, the value on the right side in the formula (1) was set to 20, and the coefficients on the left side were set to 0.7, 0.8, and 1.0.

The overcoat liquid according to an embodiment of the present disclosure has high rubbing fastness because the content of the organic solvent satisfies the formula (1).

Examples of the organic solvent A include polyhydric alcohols such as ethylene glycol (boiling point: 198° C.), propylene glycol (boiling point: 188° C.), 1,2-butanediol (boiling point: 194° C.), 2,3-butanediol (boiling point: 183° C.), 2-methyl-1,3-propanediol (boiling point: 124° C.), 2-methyl-2,4-pentanediol (boiling point: 198° C.), 1,2,6-hexanetriol (boiling point: 178° C.), 1,2,3-butanetriol (boiling point: 175° C.), and 1,2,4-butanetriol (boiling point: 170° C.); polyhydric alcohol alkyl ethers such as ethylene glycol monoethyl ether (boiling point: 135° C.), ethylene glycol n-propyl ether (boiling point: 150° C.), ethylene glycol monobutyl ether (boiling point: 171° C.), propylene glycol monoethyl ether (boiling point: 133° C.), propylene glycol n-butyl ether (boiling point: 171° C.), propylene glycol t-butyl ether (boiling point: 153° C.), tetraethylene glycol monomethyl ether (boiling point: 159° C.), diethylene glycol methyl ether (boiling point: 194° C.), diethylene glycol n-butyl ether (boiling point: 171° C.), and dipropylene glycol monomethyl ether (boiling point: 188° C.); and nitrogen-containing compounds such as ε-caprolactam (boiling point: 137° C.), N-methylformamide (boiling point: 199° C.), and N,N-dimethylformamide (boiling point: 153° C.). In particular, from the viewpoint of storage stability and ejection stability, the organic solvent A is preferably a glycol compound and more preferably an alkylene glycol such as ethylene glycol or propylene glycol. The organic solvents A may be used alone or in combination of two or more.

Examples of the organic solvent B include polyhydric alcohols such as diethylene glycol (boiling point: 244° C.), dipropylene glycol (boiling point: 231° C.), 1,3-propanediol (boiling point: 214° C.), 1,3-butanediol (boiling point: 208° C.), 1,4-butanediol (boiling point: 230° C.), 1,2-pentanediol (boiling point: 206° C.), 2,4-pentanediol (boiling point: 201° C.), 2-methyl-1,3-butanediol (boiling point: 203° C.), 3-methyl-1,3-butanediol (boiling point: 203° C.), 1,5-pentanediol (boiling point: 242° C.), 2,2-dimethyl-1,3-propanediol (boiling point: 208° C.), 1,2-hexanediol (boiling point: 223° C.), 1,6-hexanediol (boiling point: 250° C.), 2,5-hexanediol (boiling point: 217° C.), and 2-ethyl-1,3-hexanediol (boiling point: 243° C.); polyhydric alcohol alkyl ethers such as diethylene glycol monoethyl ether (boiling point: 202° C.), diethylene glycol monobutyl ether (boiling point: 230° C.), triethylene glycol methyl ether (boiling point: 249° C.), dipropylene glycol n-propyl ether (boiling point: 213° C.), and tripropylene glycol methyl ether (boiling point: 243° C.); polyhydric alcohol aryl ethers such as ethylene glycol phenyl ether (boiling point: 237° C.) and propylene glycol phenyl ether (boiling point: 243° C.); and nitrogen-containing compounds such as N-methyl-2-pyrrolidone (boiling point: 204° C.), 2-pyrrolidone (boiling point: 245° C.), 1,3-dimethylimidazolidinone (boiling point: 220° C.), and N-methylpyrrolidinone (boiling point: 202° C.). In particular, from the viewpoint of storage stability and ejection stability, the organic solvent B is preferably a glycol compound and more preferably an alkylene glycol such as diethylene glycol or dipropylene glycol. The organic solvents B may be used alone or in combination of two or more.

Examples of the organic solvent C include polyhydric alcohols such as triethylene glycol (boiling point: 287° C.), tripropylene glycol (boiling point: 273° C.), tetraethylene glycol (boiling point: 314° C.), and glycerol (boiling point: 290° C.); polyhydric alcohol alkyl ethers such as triethylene glycol ethyl ether (boiling point: 256° C.), diethylene glycol n-hexyl ether (boiling point: 259° C.), and tripropylene glycol n-propyl ether (boiling point: 261° C.); and polyhydric alcohol aryl ethers such as ethylene glycol monobenzyl ether (boiling point: 256° C.). In particular, from the viewpoint of storage stability and ejection stability, the organic solvent C is preferably a glycol compound and more preferably an alkylene glycol such as triethylene glycol, tripropylene glycol, or tetraethylene glycol. The organic solvents C may be used alone or in combination of two or more.

Water

The overcoat liquid according to an embodiment of the present disclosure includes water. The content of water is preferably 30 mass % to 80 mass % and more preferably 40 mass % to 60 mass % relative to the total amount of the overcoat liquid.

Crosslinking Agent

The overcoat liquid according to an embodiment of the present disclosure may further include a crosslinking agent. When the crosslinking agent is included, the anionic polyurethane particles form a crosslinked structure, which makes the film formed of the overcoat liquid stronger, thereby improving the rubbing fastness. The crosslinking agents may be used alone or in combination of two or more.

The crosslinking agent is not particularly limited as long as it can crosslink anionic polyurethane particles with each other. The crosslinking agent is, for example, a blocked isocyanate or a carbodiimide compound and is preferably a blocked isocyanate from the viewpoint of further improving wet rubbing fastness.

The blocked isocyanate has a structure in which an isocyanate group of an isocyanate compound is protected by a blocking agent. When the blocked isocyanate is heated, the blocking agent is dissociated and the isocyanate group is regenerated.

Examples of the isocyanate compound constituting the blocked isocyanate include 2,4-tolylene diisocyanate, 2,6-tolylene diisocyanate, isophorone diisocyanate, 1,6-hexamethylene diisocyanate, 1,3-trimethylene diisocyanate, 1,4-tetramethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, 2,2'-diethyl ether diisocyanate, diphenylmethane-4,4'-diisocyanate, o-xylene diisocyanate, m-xylene diisocyanate, p-xylene diisocyanate, methylenebis(cyclohexyl isocyanate), cyclohexane-1,3-dimethylene diisocyanate, cyclohexane-1,4-dimethylene diisocyanate, 1,5-naphthalene diisocyanate, p-phenylene diisocyanate, 3,3'-methyleneditolylene-4,4'-diisocyanate, 4,4'-diphenyl ether diisocyanate, tetrachlorophenylene diisocyanate, norbornane diisocyanate, hydrogenated 1,3-xylylene diisocyanate, and hydrogenated 1,4-xylylene diisocyanate. In particular, from the viewpoint of further improving the wet rubbing fastness, the blocked isocyanate is preferably 1,6-hexamethylene diisocyanate or isophorone diisocyanate.

Examples of the blocking agent for protecting the isocyanate group of the isocyanate compound include an oxime compound, a lactam compound, a phenol compound, an alcohol compound, an amine compound, an active methylene compound, a pyrazole compound, a mercaptan compound, an imidazole compound, and an imide compound. In particular, a pyrazole compound, a lactam compound, or a phenol compound is preferable. Specifically, pyrazole, ε-caprolactam, or phenol is preferable from the viewpoint of dissociation temperature.

The dissociation temperature of the blocked isocyanate is preferably as low as possible from the viewpoint of crosslinking efficiency, but is preferably as high as possible from the viewpoint of storage stability. Specifically, the dissociation temperature is preferably 90° C. to 180° C., more preferably 90° C. to 120° C., and particularly preferably 110° C. to 120° C.

Preferably, the blocked isocyanate has a hydrophilic group and is water-soluble or self-emulsifiable. The self-emulsifiable blocked isocyanate is present in the form of particles in the overcoat liquid. When the blocked isocyanate is in the form of particles, the average particle size is preferably 200 nm or less from the viewpoint of ejection property. The particle size is determined by measuring a volume-average particle size by a dynamic light scattering method using a Nanotrac particle size distribution analyzer (product name "UPA-EX150", manufactured by Nikkiso Co., Ltd.).

The blocked isocyanate may be a commercially available product. Examples of the commercially available product include Meikanate CX and SU-268A manufactured by Meisei Chemical Works, Ltd; Aqua BI200 and Aqua BI201 manufactured by Baxenden; Coronate BI-301, Coronate 2507, and Coronate 2554 manufactured by Tosoh Corporation; Duranate MF-K60B, Duranate SBB-70P, Duranate SBN-70D, Duranate MF-B60B, Duranate 17B-60P, Duranate TPA-B80E, and Duranate E402-B80B manufactured by Asahi Kasei Corporation; Desmodur BL1100/1, Desmodur BL1265/1 MPA/X, Desmodur BL2078/2, Desmodur BL3175 SN, Desmodur BL3272 MPA, Desmodur BL3370 MPA, Desmodur BL3475 BA/SN, Desmodur BL3575/1 MPA/SN, Desmodur BL3660 IB/X, Desmodur BL4265 SN, and Desmodur BL5375 manufactured by Covestro Japan Ltd.; and Takelac WS series manufactured by Mitsui Chemicals, Inc.

The content of the crosslinking agent is preferably 0.1 mass % to 10 mass %, more preferably 0.5 mass % to 8 mass %, and further preferably 1 mass % to 5 mass % relative to the total amount of the overcoat liquid.

Thickener

The overcoat liquid according to an embodiment of the present disclosure may further include a thickener. When the thickener is included in an appropriate amount, the viscosity of the overcoat liquid is appropriately increased, which improves the ejection property.

Upon ejection of the overcoat liquid, if droplets of the overcoat liquid land off course or if there is ejection failure in which the amount of the overcoat liquid jetted is smaller than that of the overcoat liquid to be jetted, an ink image is sometimes not sufficiently covered with a film formed of the overcoat liquid. If the ink image is not sufficiently covered with the film formed of the overcoat liquid, the ink image is easily peeled off by rubbing, which tends to deteriorate the rubbing fastness, in particular, the wet rubbing fastness. On the other hand, when the ejection property of the overcoat liquid is good, the ink image is covered with the film formed of the overcoat liquid without any gap, which improves the rubbing fastness.

The thickener is preferably a polyethylene glycol having a weight-average molecular weight (Mw) of 4000 or more, or a block polymer constituted by a polyethylene glycol and a polypropylene glycol that have a weight-average molecular weight (Mw) of 4000 or more. The weight-average molecular weight (Mw) of the thickener is more preferably 10000 to 50000 and further preferably 15000 to 30000. The weight-average molecular weight (Mw) of the thickener is measured by gel permeation chromatography (GPC). The GPC was performed with HLC-8220GPC (manufactured by Tosoh Corporation) using three columns of TSKgeL Super HZM-H, TSKgeL Super HZ4000, and TSKgeL Super HZ2000 (manufactured by Tosoh Corporation, 4.6 mmID× 15 cm) and N-methylpyrrolidone as an eluant. The weight-average molecular weight (Mw) was calculated in terms of polystyrene.

When a block polymer constituted by polyethylene glycol and polypropylene glycol is used as the thickener, the ratio of the number of repeating units composed of polyethylene glycol to the number of repeating units composed of polypropylene glycol is preferably 1/4 to 4.

The content of the thickener is preferably 0.01 mass % to 4.0 mass % and more preferably 0.1 mass % to 2.0 mass % relative to the total amount of the overcoat liquid.

Additive

The overcoat liquid according to an embodiment of the present disclosure may further optionally include an additive within a range that does not impair the effects of the present disclosure. Examples of the additive include surfactants, pH adjusters, and preservatives.

Examples of the surfactants include anionic surfactants such as fatty acid salts, higher alcohol esters, alkylbenzene sulfonates, sulfosuccinates, and higher alcohol phosphates; cationic surfactants such as aliphatic amine salts and quaternary ammonium salts; nonionic surfactants such as ethylene oxide adducts of higher alcohols, ethylene oxide adducts of alkylphenols, ethylene oxide adducts of polyhydric alcohol fatty acid esters, and acetylene glycol and ethylene oxide adducts thereof; and amphoteric surfactants such as amino acid type surfactants and betaine type surfactants. In particular, the surfactant is preferably a nonionic surfactant and more preferably acetylene glycol or an ethylene oxide adduct thereof. Specifically, the surfactant is particularly preferably an ethylene oxide adduct of 2,4,7,9-tetramethyl-5-decyne-4,7-diol. Note that Olfine E1010 and Olfine E1020 manufactured by Nissin Chemical Co., Ltd. are ethylene oxide adducts of 2,4,7,9-tetramethyl-5-decyne-4,7-diol. Olfine E1010 has 10 ethylene oxides and Olfine E1020 has 20 ethylene oxides.

The viscosity of the overcoat liquid is preferably 1 mPa·s to 15 mPa·s, more preferably 2 mPa·s to 13 mPa·s, and further preferably 2.5 mPa·s to 10 mPa·s. The viscosity is a value measured in an environment of 32° C. and 50% RH using a vibration viscometer (product name "DV-II+ VISCOMETER", manufactured by BROOKFIELD).

The overcoat liquid preferably has a surface tension of 20 mN/m to 60 mN/m. The surface tension is more preferably 20 mN/m to 45 mN/m and further preferably 25 mN/m to 40 mN/m. The surface tension is a value measured using a surface tensiometer (DY-700, manufactured by Kyowa Interface Science Co., Ltd.) while the liquid temperature is kept at 30° C.

Ink Set for Inkjet Textile Printing

The overcoat liquid can be combined with a color ink to provide an ink set. The ink set for inkjet textile printing according to an embodiment of the present disclosure includes the overcoat liquid and a color ink. The color ink refers to an ink including a coloring agent. Examples of the coloring agent include dyes and pigments, and pigments are preferable from the viewpoint of durability such as heat resistance, light resistance, and water resistance.

When a pigment is used as the coloring agent, the pigment can be contained in the color ink as a pigment dispersion body. The use of the pigment dispersion body is preferred from the viewpoint of improving solvent resistance. The pigment dispersion body may be a pigment dispersed with a pigment dispersing agent or a self-dispersible pigment. The self-dispersible pigment refers to a pigment which can be dispersed without a pigment dispersing agent, and is preferably a pigment having a polar group on its surface.

The pigment may be any of commercially available organic pigments and inorganic pigments. Furthermore, a pigment dispersed using a dispersing agent such as a water-insoluble resin or a pigment having a resin grafted on the surface thereof can also be used. Examples of these pigments include pigments described in "Dictionary of Pigments" edited by Seishiro Ito (published in 2000), W. Herbst, K. Hunger "Industrial Organic Pigments", JP2002-12607A, JP2002-188025A, JP2003-26978A, and JP2003-342503A.

The content of the coloring agent is preferably 0.5 mass % to 10 mass % and more preferably 1 mass % to 6 mass % relative to the total amount of the color ink.

In the present disclosure, components other than the coloring agent included in the color ink are not particularly limited, and examples of the other components include water, an organic solvent, and a polymer. When a pigment is used as the coloring agent, a pigment dispersing agent may be added. The pigment dispersing agent may be a publicly known product. Examples of the pigment dispersing agent include surfactants such as higher fatty acid salts, alkyl sulfates, alkyl ester sulfates, alkyl sulfonates, sulfosuccinates, naphthalene sulfonates, alkyl phosphates, polyoxyalkylene alkyl ether phosphates, polyoxyalkylene alkyl phenyl ethers, polyoxyethylene polyoxypropylene glycols, glycerol esters, sorbitan esters, polyoxyethylene fatty acid amides, and amine oxides; and block copolymers and random copolymers composed of two or more monomers selected from the group consisting of styrene, styrene derivatives, vinylnaphthalene derivatives, acrylic acid, acrylic acid derivatives, maleic acid, maleic acid derivatives, itaconic acid, itaconic acid derivatives, fumaric acid, and fumaric acid derivatives, and salts thereof.

Examples of the organic solvent included in the color ink include the organic solvent A, the organic solvent B, and the organic solvent C exemplified as the water-soluble organic solvents included in the overcoat liquid. The content of the organic solvent is preferably 10 mass % to 60 mass % and more preferably 15 mass % to 40 mass % relative to the total amount of the color ink.

The polymer included in the color ink is preferably a water-soluble polymer or a water-dispersible polymer. Examples of the polymer include a urethane resin, a polyester resin, an acrylic resin, a vinyl acetate resin, a vinyl chloride resin, a styrene-acrylic resin, and a styrene-butadiene copolymer. When the polymer is a water-soluble polymer, the polymer is preferably included in the color ink in the form of an aqueous solution. When the polymer is a water-dispersible polymer, the polymer is preferably included in the color ink in the form of a water dispersion liquid.

The color ink may further optionally include an additive as long as the effects of the present disclosure are not impaired. Examples of the additive include surfactants, pH adjusters, and preservatives. The surfactant may be the surfactant included in the overcoat liquid.

The viscosity of the color ink is preferably 1 mPa·s to 15 mPa·s, more preferably 2 mPa·s to 13 mPa·s, and further preferably 2.5 mPa·s to 10 mPa·s. The viscosity is a value measured in an environment of 32° C. and 50% RH using a vibration viscometer (product name "DV-II+ VISCOMETER", manufactured by BROOKFIELD).

The color ink preferably has a surface tension of 20 mN/m to 60 mN/m. The surface tension is more preferably 20 mN/m to 45 mN/m and further preferably 25 mN/m to 40 mN/m. The surface tension is a value measured using a surface tensiometer (DY-700, manufactured by Kyowa Interface Science Co., Ltd.) while the liquid temperature is kept at 30° C.

Inkjet Textile Printing Method

The inkjet textile printing method according to an embodiment of the present disclosure includes a first step of jetting a color ink onto a fabric by an inkjet recording method and a second step of jetting, by an inkjet recording method, an overcoat liquid onto the fabric onto which the color ink has been jetted. The color ink and the overcoat liquid may be those described above. The second step is preferably performed 0.1 seconds to 120 seconds after the first step.

Hereafter, the second step and the first step will be described in this order.

Second Step

The second step in the inkjet textile printing method according to an embodiment of the present disclosure is a step of jetting, by an inkjet recording method, an overcoat liquid onto the fabric onto which the color ink has been jetted.

The inkjet recording method may be a publicly known method. Examples of the inkjet recording method include a charge control method in which an overcoat liquid is jetted by using electrostatic attraction, a drop-on-demand method (pressure pulse method) that uses vibration pressure of a piezoelectric element, an acoustic inkjet method in which an overcoat liquid is jetted using radiation pressure by converting an electric signal into an acoustic beam and irradiating the overcoat liquid with the acoustic beam, and a thermal inkjet method in which an overcoat liquid is heated to form bubbles and the generated pressure is used.

In general, image recording methods with an inkjet recording apparatus include a shuttle scanning system (also referred to as a "serial head system") in which image recording is performed using a short serial head, and a single pass system (also referred to as a "line head system") in which image recording is performed using a line head including recording elements arranged so as to correspond to the entire region of a recording medium in the width direction. In the shuttle scanning system, image recording is performed while the recording medium is scanned with the serial head in its width direction. On the other hand, in the single pass system, image recording can be performed on the entire surface of the recording medium by scanning the recording medium in a direction orthogonal to the direction in which the recording elements are arranged. Therefore, unlike the shuttle scanning system, the single pass system does not require a conveyance system such as a carriage for scanning with a serial head. Furthermore, in the single pass system, complicated scanning control between movement of a carriage and a recording medium is not required and only the recording medium moves. Therefore, the recording speed can be increased compared with the shuttle scanning system.

In the second step, the overcoat liquid is preferably jetted by a single pass system. Use of the single pass system improves the ejection accuracy. Thus, the ink image is covered with the film formed of the overcoat liquid without any gap, which improves the rubbing fastness.

The volume of droplets of the overcoat liquid jetted from an inkjet head is preferably 1 pL (picoliter) to 150 pL, more preferably 2 pL to 120 pL, and particularly preferably 20 pL to 60 pL. Note that the volume of droplets refers to a volume of ink jetted from one nozzle at a time by an inkjet recording method.

The amount of the overcoat liquid applied is preferably 10 $g/m^2$ to 30 $g/m^2$ and more preferably 15 $g/m^2$ to 25 $g/m^2$ from the viewpoint of rubbing fastness and texture.

The resolution in jetting the overcoat liquid is preferably 200 dpi (dot per inch) or more×200 dpi or more and more preferably 400 dpi or more×400 dpi or more and 1200 dpi or less×1200 dpi or less. Note that "dpi" refers to the number of dots per 25.4 mm.

In the second step, the overcoat liquid is preferably jetted using an inkjet recording apparatus having a liquid circulation mechanism configured to circulate the overcoat liquid between a liquid tank and an inkjet head. Specifically, the inkjet recording apparatus having a liquid circulation mechanism is an apparatus that supplies an overcoat liquid from a liquid tank storing the overcoat liquid to an inkjet head and that collects the overcoat liquid from the inkjet head to the liquid tank, thereby circulating the overcoat liquid between the liquid tank and the inkjet head and ejecting the overcoat liquid. When the overcoat liquid remains in the vicinity of the nozzle, the nozzle is likely to be clogged because of drying of the overcoat liquid, which tends to cause ejection failure. Upon ejection of the overcoat liquid, if there is ejection failure in which the amount of the overcoat liquid jetted is smaller than that of the overcoat liquid to be jetted, an ink image is sometimes not sufficiently covered with a film formed of the overcoat liquid. If the ink image is not sufficiently covered with the film formed of the overcoat liquid, the ink image is easily peeled off by rubbing, which tends to deteriorate the rubbing fastness, in particular, the wet rubbing fastness. On the other hand, when the ejection property of the overcoat liquid is good, the ink image is covered with the film formed of the overcoat liquid without any gap, which improves the rubbing fastness. When an inkjet recording apparatus having a liquid circulation mechanism is used, the overcoat liquid in the vicinity of the nozzle is always fresh. Thus, the overcoat liquid can be stably jetted, which improves the rubbing fastness.

The inkjet textile printing method according to an embodiment of the present disclosure may have, after the second step, a drying step of drying the fabric on which the image has been recorded. The heating means for drying is not particularly limited. Examples of the heating means include a heating drum, hot air, an infrared lamp, a heating oven, a heating plate, a heating press, and a hot plate. The heating temperature is preferably 200° C. or lower, more preferably 100° C. to 180° C., and further preferably 120° C. to 170° C. The heating time is preferably 5 seconds to 200 seconds and more preferably 30 seconds to 160 seconds.

First Step

The first step in the inkjet textile printing method according to an embodiment of the present disclosure is a step of jetting a color ink onto a fabric by an inkjet recording method.

The ejection conditions in the first step are not particularly limited, but the first step and the second step are preferably performed continuously. The first step and the second step are preferably performed using the same inkjet recording apparatus. Therefore, the inkjet recording method in the first step is not particularly limited, but is preferably the same as in the second step. The color ink is also preferably jetted by a single pass system similarly to the overcoat liquid. Furthermore, when the first step and the second step are performed using the same inkjet recording apparatus, the inkjet recording apparatus preferably has a liquid circulation mechanism configured to circulate the overcoat liquid between the liquid tank and the inkjet head and an ink circulation mechanism configured to circulate the color ink between an ink tank and the inkjet head.

The volume of droplets of the color ink jetted from an inkjet head is preferably 1 pL to 150 pL, more preferably 2 pL to 120 pL, and particularly preferably 20 pL to 60 pL.

The amount of the color ink applied is not particularly limited, but is preferably 10 g/m$^2$ to 30 g/m$^2$ and more preferably 15 g/m$^2$ to 25 g/m$^2$.

The resolution in jetting the color ink is preferably 200 dpi (dot per inch) or more×200 dpi or more and more preferably 400 dpi or more×400 dpi or more and 1200 dpi or less×1200 dpi or less.

The inkjet textile printing method according to an embodiment of the present disclosure can be applied to various types of fabrics. Examples of fibers constituting the fabric include synthetic fibers such as nylon, polyester, and acrylonitrile; semi-synthetic fibers such as acetate; regenerated fibers such as rayon; and natural fibers such as cotton, silk, and wool. Blended fibers may also be used. The fabric may be in any form of web, knitted fabric, non-woven fabric, and the like of the above fibers.

The inkjet textile printing method according to an embodiment of the present disclosure can be applied to all products using fabrics. Specifically, the inkjet textile printing method can be applied to clothing such as a T-shirt, a trainer, a jersey, pants, a sweat suit, a one-piece, and a blouse; bedding; or handkerchiefs.

Inkjet Recording Apparatus

The inkjet recording apparatus used in the inkjet textile printing method according to an embodiment of the present disclosure preferably has transport means for transporting a fabric, image recording means for recording an image on the transported fabric, overcoat liquid applying means for applying an overcoat liquid to the fabric on which the image has been recorded, and winding means for winding the fabric, and preferably further has drying means for drying the fabric. By using an inkjet recording apparatus having the transport means, the image recording means, the overcoat liquid applying means, and the winding means, textile printing can be continuously performed on a long fabric. The inkjet recording apparatus is provided with, for example, an inkjet head as the image recording means and the overcoat liquid applying means. For the transport means, for example, a feed roller and a pressing roller paired with the feed roller are provided on each of the upstream side and the downstream side of the inkjet head in the transport direction. The fabric is sandwiched between the feed roller and the pressing roller, and is transported when the feed roller is rotated. For the fabric on which an image has been recorded and to which the overcoat liquid has been applied, the image-recorded surface first comes into contact with a pressing roller provided on the downstream side of the inkjet head in the transport direction. At this time, if the image-recorded surface is wet with the color ink and the overcoat liquid, a part of the film formed of the color ink and the overcoat liquid may be peeled off and the color may be transferred to the pressing roller. If the fabric is continuously transported in a state in which the pressing roller is contaminated, there is a possibility that color transfer occurs to a fabric transported later. In the present disclosure, the content of the water-soluble organic solvent included in the overcoat liquid satisfies the formula (1), which achieves excellent drying property. Therefore, textile printing can be continuously performed on a long fabric for a long time without contaminating the pressing roller.

EXAMPLES

Hereafter, the present disclosure will be further specifically described based on Examples, but is not limited to Examples below within the spirit of the present disclosure. For each component added in the form of a dispersion liquid when the ink and the overcoat liquid are prepared, the content of the component is described instead of the content of the dispersion liquid. For example, in the case where an aqueous dispersion liquid of anionic polyurethane is used, the content of anionic polyurethane particles is described. In the case where an aqueous dispersion liquid of wax is used, the content of wax particles is described.

Example 1

Preparation of Black Ink

Each component was mixed so as to have the following content. A disposable plastic syringe was filled with the mixture. Filtration was performed using a PVDF (polyvinylidene fluoride) filter having a pore size of 5 μm (Millex-SV, diameter 25 mm, manufactured by Millipore) to prepare a black ink having a pigment concentration of 4 mass %.

Black pigment dispersion liquid (product name "Projet (registered trademark) Black APD1000", manufactured by FUJIFILM Imaging Colorants Inc., pigment concentration: 14 mass %) . . . 4 mass %

Glycerol . . . 15 mass %

Triethylene glycol . . . 10 mass %

Surfactant (product name "Olfine E1010", manufactured by Nissin Chemical Co., Ltd.) . . . 1 mass %

Aqueous dispersion liquid of styrene-butadiene copolymer (product name "Rovene 4170", manufactured by Mallard Creek Polymers, average particle size: 0.14 μm) . . . 6 mass %

Water . . . the balance (mass %) in the case where the total amount of ink is 100 mass %

Preparation of Overcoat Liquid

Each component was mixed so as to have the following content to prepare an overcoat liquid.

Aqueous dispersion liquid of a carboxy group-containing anionic polyurethane having a carbonate structure (product name "Superflex 460", manufactured by Daiichi Kogyo Seiyaku Co., Ltd., average particle size: 0.04 μm) . . . 7.5 mass %

Aqueous dispersion liquid of polyethylene wax (product name "Hitec E-6314", manufactured by Toho Chemical Industry Co., Ltd., average particle size: 0.1 μm) . . . 1 mass %

Organic solvent C: triethylene glycol (boiling point: 287° C.) . . . 15 mass %

Crosslinking agent (blocked isocyanate): aqueous dispersion liquid of blocked hexamethylene diisocyanate (product name "Meikanate CX", manufactured by Meisei Chemical Works, Ltd., average particle size: 0.15 μm) . . . 2 mass %

Surfactant (product name "Olfine E1010", manufactured by Nissin Chemical Co., Ltd.) . . . 1 mass %

Water . . . the balance (mass %) in the case where the total amount of overcoat liquid is 100 mass %

Image Recording

An apparatus equipped with an inkjet head (product name "StarFire SG-1024SA", manufactured by Fujifilm Dimatix) and an ink circulating pump was provided as an inkjet recording apparatus. As a recording medium, a long 100% cotton cloth (product name "Cotton D5005", manufactured by Akahori Sangyo) was fixed on a stage. Two ink tanks connected to the inkjet head were individually filled with an overcoat liquid and a black ink. The inkjet jet heads were disposed in a line so that nozzles were arranged in a direction orthogonal to the moving direction of the stage. For the ejection conditions of the black ink and the overcoat liquid, the volume of droplets was set to 40 pL, the ejection frequency was set to 10 kHz, and the resolution was set to 400 dpi×400 dpi. The ink circulating pump was operated so that the overcoat liquid and the black ink were circulated between the ink tanks and the inkjet head. First, the black ink was jetted onto the entire surface of the recording medium to record a solid image. Subsequently, the overcoat liquid was jetted onto the entire surface of the recording medium. Then, the image-recorded surface was dried using a heat press at 160° C. for 120 seconds, and the recording medium on which the image was recorded was wound in a roll shape to obtain an image recorded sample. The recording medium on which the image was recorded was transported between the paired rollers of the feed roller and the pressing roller and wound, but color transfer to the pressing roller was not observed.

Example 2

An overcoat liquid was prepared in the same manner as in Example 1, except that the type and content of the water-soluble organic solvent in the overcoat liquid of Example 1 were changed to those described below, and a thickener was further added. A black ink was prepared in the same manner as in Example 1. Image recording was performed in the same manner as in Example 1 to obtain an image recorded sample.

Organic solvent A: propylene glycol (boiling point: 188° C.) . . . 5 mass %

Organic solvent C: triethylene glycol (boiling point: 287° C.) . . . 10 mass %

Thickener: polyethylene glycol (product name "polyethylene glycol 20000", manufactured by Fujifilm Wako Pure Chemical Corporation, weight-average molecular weight: 20000) . . . 1 mass %

Example 3

An overcoat liquid was prepared in the same manner as in Example 1, except that the water-soluble organic solvent in the overcoat liquid of Example 1 was changed to the following. A black ink was prepared in the same manner as in Example 1. Image recording was performed in the same manner as in Example 1 to obtain an image recorded sample.

Organic solvent C: tetraethylene glycol (boiling point: 314° C.)

Example 4

An overcoat liquid was prepared in the same manner as in Example 2, except that the type and content of the water-soluble organic solvent in the overcoat liquid of Example 2 were changed to those described below. A black ink was prepared in the same manner as in Example 1. Image recording was performed in the same manner as in Example 1 to obtain an image recorded sample.

Organic solvent A: propylene glycol (boiling point: 188° C.) . . . 5 mass %

Organic solvent B: dipropylene glycol (boiling point: 231° C.) . . . 5 mass %

Organic solvent C: triethylene glycol (boiling point: 287° C.) . . . 5 mass %

Example 5

An overcoat liquid was prepared in the same manner as in Example 2, except that the type and content of the water-soluble organic solvent in the overcoat liquid of Example 2 were changed to those described below. A black ink was prepared in the same manner as in Example 1. Image recording was performed in the same manner as in Example 1 to obtain an image recorded sample.

Organic solvent A: propylene glycol (boiling point: 188° C.) . . . 25 mass %

Example 6

An overcoat liquid was prepared in the same manner as in Example 2, and a black ink was prepared in the same manner as in Example 1. An image recorded sample was obtained by performing image recording in the same manner as in Example 1, except that the inkjet recording apparatus used in the image recording of Example 1 was used without operating the ink circulating pump.

Example 7

An overcoat liquid was prepared in the same manner as in Example 1, except that the content of the wax particles in the overcoat liquid of Example 1 was changed from 1 mass % to 0.2 mass %. A black ink was prepared in the same manner as in Example 1. Image recording was performed in the same manner as in Example 1 to obtain an image recorded sample.

Example 8

An overcoat liquid was prepared in the same manner as in Example 3, except that the content of the wax particles in the overcoat liquid of Example 3 was changed from 1 mass % to 2.5 mass %. A black ink was prepared in the same manner as in Example 1. Image recording was performed in the same manner as in Example 1 to obtain an image recorded sample.

Example 9

An overcoat liquid was prepared in the same manner as in Example 1, except that the content of the anionic polyurethane particles in the overcoat liquid of Example 1 was changed from 7.5 mass % to 4.5 mass %. A black ink was prepared in the same manner as in Example 1. Image recording was performed in the same manner as in Example 1 to obtain an image recorded sample.

Example 10

An overcoat liquid was prepared in the same manner as in Example 1, except that the content of the anionic polyurethane particles in the overcoat liquid of Example 1 was changed from 7.5 mass % to 18 mass %. A black ink was prepared in the same manner as in Example 1. Image recording was performed in the same manner as in Example 1 to obtain an image recorded sample.

Example 11

An overcoat liquid was prepared in the same manner as in Example 1, except that the aqueous dispersion liquid of wax in the overcoat liquid of Example 1 was changed to the following. A black ink was prepared in the same manner as in Example 1. Image recording was performed in the same manner as in Example 1 to obtain an image recorded sample.

Aqueous dispersion liquid of carnauba wax (product name "Selosol 524", manufactured by Chukyo Yushi Co., Ltd., average particle size: 0.05 μm).

Example 12

An overcoat liquid was prepared in the same manner as in Example 1, except that the crosslinking agent was not included in the overcoat liquid of Example 1. A black ink was prepared in the same manner as in Example 1. Image recording was performed in the same manner as in Example 1 to obtain an image recorded sample.

Example 13

An overcoat liquid was prepared in the same manner as in Example 1, except that the aqueous dispersion liquid of anionic polyurethane in the overcoat liquid of Example 1 was changed to the following. A black ink was prepared in the same manner as in Example 1. Image recording was performed in the same manner as in Example 1 to obtain an image recorded sample.

Aqueous dispersion liquid of a carboxy group-containing anionic polyurethane having an ester structure (product name "Superflex 740", manufactured by Dai-ichi Kogyo Seiyaku Co., Ltd., average particle size: 0.20 μm)

Example 14

An overcoat liquid was prepared in the same manner as in Example 1, except that the aqueous dispersion liquid of anionic polyurethane in the overcoat liquid of Example 1 was changed to the following. A black ink was prepared in the same manner as in Example 1. Image recording was performed in the same manner as in Example 1 to obtain an image recorded sample.

Aqueous dispersion liquid of a carboxy group-containing anionic polyurethane having an ether structure (product name "Superflex 870", manufactured by Dai-ichi Kogyo Seiyaku Co., Ltd., average particle size: 0.03 μm)

Example 15

An overcoat liquid was prepared in the same manner as in Example 2, except that the type and content of the water-soluble organic solvent in the overcoat liquid of Example 2 were changed to those described below. A black ink was prepared in the same manner as in Example 1. Image recording was performed in the same manner as in Example 1 to obtain an image recorded sample.

Organic solvent A: propylene glycol (boiling point: 188° C.) . . . 5 mass %

Organic solvent B: 2-pyrrolidone (boiling point: 245° C.) . . . 5 mass %

Organic solvent C: triethylene glycol (boiling point: 287° C.) . . . 5 mass %

Example 16

An overcoat liquid was prepared in the same manner as in Example 2, except that the type and content of the water-soluble organic solvent in the overcoat liquid of Example 2 were changed to those described below. A black ink was prepared in the same manner as in Example 1. Image recording was performed in the same manner as in Example 1 to obtain an image recorded sample.

Organic solvent A: propylene glycol (boiling point: 188° C.) . . . 5 mass %

Organic solvent B: dipropylene glycol (boiling point: 231° C.) . . . 7 mass %

Organic solvent C: triethylene glycol (boiling point: 287° C.) . . . 10 mass %

Example 17

An overcoat liquid was prepared in the same manner as in Example 2, except that the type and content of the water-soluble organic solvent in the overcoat liquid of Example 2 were changed to those described below. A black ink was prepared in the same manner as in Example 1. Image recording was performed in the same manner as in Example 1 to obtain an image recorded sample.

Organic solvent A: ethylene glycol (boiling point: 198° C.) . . . 25 mass %

Example 18

An overcoat liquid was prepared in the same manner as in Example 2, except that the type and content of the water-soluble organic solvent in the overcoat liquid of Example 2 were changed to those described below. A black ink was prepared in the same manner as in Example 1. Image recording was performed in the same manner as in Example 1 to obtain an image recorded sample.
  Organic solvent A: propylene glycol (boiling point: 188° C.) . . . 5 mass %
  Organic solvent B: diethylene glycol monobutyl ether (DEGmBE) (boiling point: 230° C.) . . . 7 mass %
  Organic solvent C: triethylene glycol (boiling point: 287° C.) . . . 10 mass %

Example 19

An overcoat liquid was prepared in the same manner as in Example 1, except that the crosslinking agent of Example 1 was changed to the following. A black ink was prepared in the same manner as in Example 1. Image recording was performed in the same manner as in Example 1 to obtain an image recorded sample.
  Crosslinking agent (polyfunctional epoxy resin): trimethylolpropane polyglycidyl ether (product name "Denacol EX-321", manufactured by Nagase ChemteX Corporation)

Example 20

An overcoat liquid was prepared in the same manner as in Example 1, except that a thickener was further added to the overcoat liquid of Example 1. A black ink was prepared in the same manner as in Example 1. Image recording was performed in the same manner as in Example 1 to obtain an image recorded sample.
  Thickener: block polymer constituted by polyethylene glycol and polypropylene glycol (product name "Newpol PE-75", manufactured by Sanyo Chemical Industries, Ltd., weight-average molecular weight: 4100, polyoxyethylene chain:polyoxypropylene chain=48:35) . . . 2 mass %

Comparative Example 1

Only a black ink was prepared in the same manner as in Example 1 without preparing an overcoat liquid. Image recording was performed in the same manner as in Example 1 by jetting the black ink to obtain an image recorded sample.

Comparative Example 2

An overcoat liquid was prepared in the same manner as in Example 2, except that the aqueous dispersion liquid of anionic polyurethane in the overcoat liquid of Example 2 was changed to the following. A black ink was prepared in the same manner as in Example 1. Image recording was performed in the same manner as in Example 1 to obtain an image recorded sample.
  Aqueous dispersion liquid of styrene-butadiene copolymer (product name "Rovene 4170", manufactured by Mallard Creek Polymers)

Comparative Example 3

An overcoat liquid was prepared in the same manner as in Comparative Example 2, except that the content of the styrene-butadiene copolymer particles in the overcoat liquid of Comparative Example 2 was changed from 7.5 mass % to 15 mass %. A black ink was prepared in the same manner as in Example 1. Image recording was performed in the same manner as in Example 1 to obtain an image recorded sample.

Comparative Example 4

An overcoat liquid was prepared in the same manner as in Example 2, except that the aqueous dispersion liquid of anionic polyurethane in the overcoat liquid of Example 2 was changed to the following. A black ink was prepared in the same manner as in Example 1. Image recording was performed in the same manner as in Example 1 to obtain an image recorded sample.
  Aqueous dispersion liquid of a cationic polyurethane having a carbonate structure (product name "Superflex 650", manufactured by Dai-ichi Kogyo Seiyaku Co., Ltd.)

Comparative Example 5

An overcoat liquid was prepared in the same manner as in Example 1, except that the content of the triethylene glycol in the overcoat liquid of Example 1 was changed from 15 mass % to 25 mass %. A black ink was prepared in the same manner as in Example 1. An image recorded sample was also obtained by performing image recording in the same manner as in Example 1, except that the inkjet recording apparatus used in the image recording of Example 1 was used without operating the ink circulating pump.

Comparative Example 6

An overcoat liquid was prepared in the same manner as in Comparative Example 5, and a black ink was prepared in the same manner as in Example 1. Image recording was performed in the same manner as in Example 1 to obtain an image recorded sample.

Comparative Example 7

An overcoat liquid was prepared in the same manner as in Example 1, except that the content of the anionic polyurethane particles in the overcoat liquid of Example 1 was changed from 7.5 mass % to 23 mass %. A black ink was prepared in the same manner as in Example 1. Image recording was performed in the same manner as in Example 1 to obtain an image recorded sample.

Comparative Example 8

An overcoat liquid was prepared in the same manner as in Example 1, except that the wax particles were not included in the overcoat liquid of Example 1. A black ink was prepared in the same manner as in Example 1. Image recording was performed in the same manner as in Example 1 to obtain an image recorded sample.

Comparative Example 9

An overcoat liquid was prepared in the same manner as in Example 1, except that the content of the wax particles in the overcoat liquid of Example 1 was changed from 1 mass % to 3.5 mass %. A black ink was prepared in the same manner as in Example 1. Image recording was performed in the same manner as in Example 1 to obtain an image recorded sample.

Comparative Example 10

An overcoat liquid was prepared in the same manner as in Example 1, except that the content of the anionic polyurethane particles in the overcoat liquid of Example 1 was changed from 7.5 mass % to 3 mass %. A black ink was prepared in the same manner as in Example 1. Image recording was performed in the same manner as in Example 1 to obtain an image recorded sample.

Comparative Example 11

An overcoat liquid was prepared in the same manner as in Example 1, except that the content of the wax particles in the overcoat liquid of Example 1 was changed from 1 mass % to 0.05 mass %. A black ink was prepared in the same manner as in Example 1. Image recording was performed in the same manner as in Example 1 to obtain an image recorded sample.

Tables 1 to 3 show the types and contents of the components included in the overcoat liquids prepared in Examples and Comparative Examples. For the polyurethane included in the overcoat liquid, the classification of the structure, the ionicity, and the content are described. Furthermore, "-" is described in the columns of the type and content of the component which was not included. Based on the content of the polyurethane particles and the content of the wax particles, the ratio of the content of the polyurethane particles to the content of the wax particles was calculated. The calculated ratio is described in "Polyurethane/Wax". Furthermore, "0.7×A+0.8×B+C" in the formula (1) was calculated based on the contents of the organic solvents A, B, and C. The calculated value is described in "Calculated value of organic solvent". When the ink circulating pump was operated during the image recording, "present" is described in the column of the liquid circulation mechanism. When the ink circulating pump was stopped, "absent" is described in the column of the liquid circulation mechanism.

Next, the image recorded samples obtained in Examples and Comparative Examples were evaluated for dry rubbing fastness, wet rubbing fastness, texture, image density, and storage stability. The evaluation methods are as follows. Tables 1 to 3 show the evaluation results.

Dry Rubbing Fastness

For each image recorded sample, the dry rubbing fastness was determined by a method of the drying test specified in ISO 105-X12:2001. The evaluation criteria are as follows. Evaluations of AA, A, and B are at a practically acceptable level.
AA: Grade 4, Grade 4-5, or Grade 5
A: Grade 3-4
B: Grade 2-3 or Grade 3
C: Grade 2
D: Grade 1 or Grade 1-2

Wet Rubbing Fastness

For each image recorded sample, the wet rubbing fastness was determined by a method of the wetting test specified in ISO 105-X12:2001. The evaluation criteria are as follows. Evaluations of AA, A, and B are at a practically acceptable level.

AA: Grade 3, Grade 3-4, Grade 4, Grade 4-5, or Grade 5
A: Grade 2-3
B: Grade 2
C: Grade 1-2
D: Grade 1

Texture

Each image recorded sample was subjected to sensory evaluation for texture. Specifically, the image recorded sample and a cloth on which image recording was not performed were touched by hand, and the texture was evaluated based on the touch feeling of the image recorded sample compared with the cloth on which image recording was not performed. The evaluation criteria are as follows. Evaluations of A and B are at a practically acceptable level.
A: No difference in touch feeling
B: The image recorded sample is slightly harder than the cloth on which image recording is not performed.
C: The image recorded sample is harder than the cloth on which image recording is not performed.
D: The image recorded sample is obviously harder than the cloth on which image recording is not performed.

Image Density

Each image recorded sample was subjected to density measurement five times using a densitometer (product name "X-Rite eXact Advance" manufactured by X-Rite Inc.) with a light source set to D50, and the average of K values was calculated. The image density was evaluated using the obtained average as an optical density (OD). The evaluation criteria are as follows. Evaluations of A and B are at a practically acceptable level.
A: OD is 1.25 or more.
B: OD is 1.20 or more and less than 1.25.
C: OD is 1.15 or more and less than 1.20.
D: OD is less than 1.15.

Storage Stability

The storage stability was evaluated by comparing the viscosity of the overcoat liquid immediately after the preparation with the viscosity of the overcoat liquid after an accelerated test. Specifically, the method is as follows.

The viscosity of the overcoat liquid immediately after the preparation was measured in an environment of 32° C. and 50% RH using a vibration viscometer (product name "DV-II+ VISCOMETER", manufactured by BROOKFIELD). The viscosity was measured using a cone plate having a cone diameter of 35 mm. The average of values obtained when the torque was in the range of 20% to 90% and the rotation speed was in the range of 0.5 rpm to 100 rpm was used as a measured value. Next, an accelerated test was performed. In the accelerated test, a part of the overcoat liquid was placed in a glass sample bottle and left in a sealed state under an environment of 60° C. for 2 weeks. The viscosity of the overcoat liquid after the accelerated test was measured in the same manner as that of the overcoat liquid immediately after the preparation. At this time, the state of the overcoat liquid after the accelerated test was visually observed to check the presence or absence of precipitates. The viscosity of the overcoat liquid immediately after the preparation was defined as "viscosity 1", and the viscosity of the overcoat liquid after the accelerated test was defined as "viscosity 2". The rate of change in viscosity was calculated from {(viscosity 2/viscosity 1)×100−100}. The storage stability was evaluated based on the rate of change in viscosity and the presence or absence of precipitates in the overcoat liquid after the accelerated test. The evaluation criteria are as follows. Evaluations of A and B are at a practically acceptable level.

A: The rate of change in viscosity was less than ±15%, and no precipitates were observed.
B: The rate of change in viscosity was ±15% or more and less than ±30%, and no precipitates were observed.
C: The rate of change in viscosity was less than ±15%, and precipitates were observed.
D: The rate of change in viscosity was ±15% or more, and precipitates were observed.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Overcoat liquid | Polyurethane Structure | Carbonate | Carbonate | Carbonate | Carbonate | Carbonate | Carbonate | Carbonate | Carbonate | Carbonate | Carbonate |
|  | Ionicity | Anionic | Anionic | Anionic | Anionic | Anionic | Anionic | Anionic | Anionic | Anionic | Anionic |
|  | Content (mass %) | 7.5 | 7.5 | 7.5 | 7.5 | 7.5 | 7.5 | 7.5 | 7.5 | 4.5 | 18 |
|  | Wax Type | Polyethylene wax | Polyethylene wax | Polyethylene wax | Polyethylene wax | Polyethylene wax | Polyethylene wax | Polyethylene wax | Polyethylene wax | Polyethylene wax | Polyethylene wax |
|  | Content (mass %) | 1 | 1 | 1 | 1 | 1 | 1 | 0.2 | 2.5 | 1 | 1 |
|  | Polyurethane/Wax | 7.5 | 7.5 | 7.5 | 7.5 | 7.5 | 7.5 | 37.5 | 3 | 4.5 | 18 |
|  | Organic solvent A Type | — | Propylene glycol | — | Propylene glycol | Propylene glycol | Propylene glycol | — | — | — | — |
|  | Content (mass %) | — | 5 | — | 5 | 25 | 5 | — | — | — | — |
|  | Organic solvent B Type | — | — | — | Dipropylene glycol | — | — | — | — | — | — |
|  | Content (mass %) | — | — | — | 5 | — | — | — | — | — | — |
|  | Organic solvent C Type | Triethylene glycol | Triethylene glycol | Tetraethylene glycol | Triethylene glycol | — | Triethylene glycol | Triethylene glycol | Tetraethylene glycol | Triethylene glycol | Triethylene glycol |
|  | Content (mass %) | 15 | 10 | 15 | 5 | — | 10 | 15 | 15 | 15 | 15 |
|  | Calculated value of organic solvent | 15 | 13.5 | 15 | 12.5 | 17.5 | 13.5 | 15 | 15 | 15 | 15 |
|  | Crosslinking agent Type | Blocked isocyanate | Blocked isocyanate | Blocked isocyanate | Blocked isocyanate | Blocked isocyanate | Blocked isocyanate | Blocked isocyanate | Blocked isocyanate | Blocked isocyanate | Blocked isocyanate |
|  | Content (mass %) | 2 | 2 | 2 | 2 | 2 | 2 | 2 | 2 | 2 | 2 |
|  | Thickener Type | — | Polyethylene glycol | — | Polyethylene glycol | Polyethylene glycol | Polyethylene glycol | — | — | — | — |
|  | Content (mass %) | — | 1 | — | 1 | 1 | 1 | — | — | — | — |
| Apparatus | Liquid circulation mechanism | present | present | present | present | present | absent | present | present | present | present |
| Evaluation | Dry rubbing fastness | A | A | A | A | B | A | B | AA | B | AA |
|  | Wet rubbing fastness | A | A | A | AA | B | B | A | A | B | AA |
|  | Texture | B | B | B | B | B | B | B | B | A | B |
|  | Image density | B | B | B | B | B | B | B | B | A | B |
|  | Storage stability | A | A | A | A | B | A | A | B | A | B |

TABLE 2

| | | | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Overcoat liquid | Polyurethane | Structure | Carbonate | Carbonate | Ester | Ether | Carbonate | Carbonate | Carbonate | Carbonate | Carbonate | Carbonate |
| | | Ionicity | Anionic | Anionic | Anionic | Anionic | Anionic | Anionic | Anionic | Anionic | Anionic | Anionic |
| | | Content (mass %) | 7.5 | 7.5 | 7.5 | 7.5 | 7.5 | 7.5 | 7.5 | 7.5 | 7.5 | 7.5 |
| | Wax | Type | Carnauba wax | Polyethylene wax | Polyethylene wax | Polyethylene wax | Polyethylene wax | Polyethylene wax | Polyethylene wax | Polyethylene wax | Polyethylene wax | Polyethylene wax |
| | | Content (mass %) | 1 | 1 | 1 | 1 | 1 | 1 | 1 | 1 | 1 | 1 |
| | | Polyurethane/Wax | 7.5 | 7.5 | 7.5 | 7.5 | 7.5 | 7.5 | 7.5 | 7.5 | 7.5 | 7.5 |
| | Organic solvent A | Type | — | — | — | — | Propylene glycol | Propylene glycol | Ethylene glycol | Propylene glycol | — | — |
| | | Content (mass %) | — | — | — | — | 5 | 5 | 25 | 5 | — | — |
| | Organic solvent B | Type | — | — | — | — | 2-Pyrrolidone | Dipropylene glycol | — | DEGmBE | — | — |
| | | Content (mass %) | — | — | — | — | 5 | 7 | — | 7 | — | — |
| | Organic solvent C | Type | Triethylene glycol | Triethylene glycol | Triethylene glycol | Triethylene glycol | Triethylene glycol | Triethylene glycol | — | Triethylene glycol | Triethylene glycol | Triethylene glycol |
| | | Content (mass %) | 15 | 15 | 15 | 15 | 5 | 10 | — | 10 | 15 | 15 |
| | Calculated value of organic solvent | | 15 | 15 | 15 | 15 | 12.5 | 19.1 | 17.5 | 19.1 | 15 | 15 |
| | Crosslinking agent | Type | Blocked isocyanate | — | Blocked isocyanate | Blocked isocyanate | Blocked isocyanate | Blocked isocyanate | Blocked isocyanate | Blocked isocyanate | Polyfunctional epoxy resin | Blocked isocyanate |
| | | Content (mass %) | 2 | — | 2 | 2 | 2 | 2 | 2 | 2 | 2 | 2 |
| | Thickener | Type | — | — | — | — | Polyethylene glycol | Polyethylene glycol | Polyethylene glycol | Polyethylene glycol | — | Block polymer |
| | | Content (mass %) | — | — | — | — | 1 | 1 | 1 | 1 | — | 2 |
| Apparatus | Liquid circulation mechanism | | present | present | present | present | present | present | present | present | present | present |
| Evaluation | Dry rubbing fastness | | B | B | A | B | A | B | B | A | B | A |
| | Wet rubbing fastness | | A | B | B | B | A | B | B | A | B | B |
| | Texture | | B | A | A | B | B | B | B | B | B | B |
| | Image density | | B | A | B | B | A | A | A | B | B | B |
| | Storage stability | | B | A | A | A | A | A | A | B | B | B |

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|
| Overcoat liquid | Polyurethane Structure | — | — | — | Carbonate | Carbonate | Carbonate | Carbonate | Carbonate | Carbonate | Carbonate | Carbonate |
| | Ionicity | — | — | — | Cationic | Anionic | Anionic | Anionic | Anionic | Anionic | Anionic | Anionic |
| | Content (mass %) | — | — | — | 7.5 | 7.5 | 7.5 | 23 | 7.5 | 7.5 | 3 | 7.5 |
| Wax | Type | — | Polyethylene wax | Polyethylene wax | Polyethylene wax | Polyethylene wax | Polyethylene wax | Polyethylene wax | — | Polyethylene wax | Polyethylene wax | Polyethylene wax |
| | Content (mass %) | — | 1 | 1 | 1 | 1 | 1 | 1 | — | 3.5 | 1 | 0.05 |
| Polyurethane/Wax | | — | — | — | 7.5 | 7.5 | 7.5 | 23 | — | 2.1 | 3 | 150 |
| Organic solvent A | Type | — | Propylene glycol | Propylene glycol | Propylene glycol | — | — | — | — | — | — | — |
| | Content (mass %) | — | 5 | 5 | 5 | — | — | — | — | — | — | — |
| Organic solvent B | Type | — | — | — | — | — | — | — | — | — | — | — |
| | Content (mass %) | — | — | — | — | — | — | — | — | — | — | — |
| Organic solvent C | Type | — | Triethylene glycol | Triethylene glycol | Triethylene glycol | Triethylene glycol | Triethylene glycol | Triethylene glycol | Triethylene glycol | Triethylene glycol | Triethylene glycol | Triethylene glycol |
| | Content (mass %) | — | 10 | 10 | 10 | 25 | 25 | 15 | 15 | 15 | 15 | 15 |
| Calculated value of organic solvent | | — | 13.5 | 13.5 | 13.5 | 25 | 25 | 15 | 15 | 15 | 15 | 15 |
| Crosslinking agent | Type | — | Blocked isocyanate | Blocked isocyanate | Blocked isocyanate | Blocked isocyanate | Blocked isocyanate | Blocked isocyanate | Blocked isocyanate | Blocked isocyanate | Blocked isocyanate | Blocked isocyanate |
| | Content (mass %) | — | 2 | 2 | 2 | 2 | 2 | 2 | 2 | 2 | 2 | 2 |
| Thickener | Type | — | Polyethylene glycol | Polyethylene glycol | Polyethylene glycol | — | — | — | — | — | — | — |
| | Content (mass %) | — | 1 | 1 | 1 | — | — | — | — | — | — | — |
| Others | Type | — | Styrene-butadiene | Styrene-butadiene | — | — | — | — | — | — | — | — |
| | Content (mass %) | — | 7.5 | 15 | — | — | — | — | — | — | — | — |
| Apparatus | Liquid circulation mechanism | — | present | present | present | absent | present | present | present | present | present | present |
| Evaluation | Dry rubbing fastness | D | B | B | C | C | B | A | D | A | C | C |
| | Wet rubbing fastness | D | D | C | D | D | C | A | C | C | D | B |
| | Texture | A | C | D | B | B | B | C | B | C | A | B |
| | Image density | B | B | D | C | B | B | B | B | C | A | B |
| | Storage stability | — | B | D | C | B | B | C | A | D | A | A |

As shown in Tables 1 and 2, in Examples 1 to 20, the overcoat liquid includes anionic polyurethane particles, wax particles, a water-soluble organic solvent, and water. The content of the anionic polyurethane particles is 4 mass % to 20 mass % relative to the total amount of the overcoat liquid. The content of the wax particles is 0.1 mass % to 3 mass % relative to the total amount of the overcoat liquid. The content of the water-soluble organic solvent satisfies the formula (1) in units of mass %. Thus, high rubbing fastness is achieved, the texture of a fabric is maintained, the image density is high, and the storage stability is high.

On the other hand, as shown in Table 3, the overcoat liquid was not applied in Comparative Example 1, and thus the rubbing fastness was poor. In Comparative Example 2, the overcoat liquid included a styrene-butadiene copolymer instead of the anionic polyurethane. Thus, the wet rubbing fastness was poor and the texture was also impaired. In Comparative Example 3, by increasing the content of the styrene-butadiene copolymer with respect to Comparative Example 2, the wet rubbing fastness was slightly improved, but the texture was further deteriorated. This decreased the image density and the storage stability. In Comparative Example 4, the overcoat liquid included cationic polyurethane particles instead of the anionic polyurethane particles. Thus, the rubbing fastness, in particular, the wet rubbing fastness was poor, the image density was poor, and the storage stability was also poor. In Comparative Example 5, the content of the water-soluble organic solvent did not satisfy the formula (1). Thus, the rubbing fastness, in particular, the wet rubbing fastness was poor. In Comparative Example 5, the overcoat liquid was applied using an inkjet recording apparatus having no liquid circulation mechanism. On the other hand, in Comparative Example 6, the overcoat liquid was applied using an inkjet recording apparatus having a liquid circulation mechanism. As a result, the rubbing fastness was slightly improved, but did not reach a practically acceptable level. In Comparative Example 7, the content of the anionic polyurethane particles was as high as 23 mass %. Thus, the texture was impaired and the storage stability was also poor. In Comparative Example 8, the overcoat liquid did not include the wax particles. Thus, the dry rubbing fastness was considerably poor. In Comparative Example 9, the content of the wax particles was as high as 3.5 mass %. Thus, the wet rubbing fastness was poor, the texture was impaired, the image density was poor, and the storage stability was also poor. In Comparative Example 10, the content of the anionic polyurethane particles was as low as 3 mass %. Thus, the rubbing fastness was poor. In Comparative Example 11, the content of the wax particles was as low as 0.05 mass %. Thus, the dry rubbing fastness was poor.

As described above, the overcoat liquid according to an embodiment of the present disclosure includes particles of an anionic polyurethane, particles of a wax, a water-soluble organic solvent, and water. The content of the particles of the anionic polyurethane is 4 mass % to 20 mass % relative to the total amount of the overcoat liquid. The content of the particles of the wax is 0.1 mass % to 3 mass % relative to the total amount of the overcoat liquid. The content of the water-soluble organic solvent satisfies the formula (1) in units of mass %. Thus, the dry rubbing fastness and the wet rubbing fastness can be improved while the texture of a fabric is maintained. The overcoat liquid according to an embodiment of the present disclosure can be combined with a color ink to provide an ink set. Furthermore, by using the inkjet textile printing method according to an embodiment of the present disclosure, it is possible to obtain a colored fabric having high dry rubbing fastness and high wet rubbing fastness while the texture is maintained.

The entire contents disclosed by JP2019-067569 filed in the Japan Patent Office on Mar. 29, 2019 are incorporated herein by reference. All documents, patent applications, and technical standards mentioned in this specification are incorporated herein by reference to the same extent as in a case where the individual documents, patent applications, and technical standards are specifically and individually described as being incorporated herein by reference.

What is claimed is:

1. An overcoat liquid for inkjet textile printing, comprising:
   particles of an anionic polyurethane;
   particles of a wax;
   a water-soluble organic solvent; and
   water,
   wherein a content of the particles of the anionic polyurethane is 4 mass % to 20 mass % relative to a total amount of the overcoat liquid,
   a content of the particles of the wax is 0.1 mass % to 3 mass % relative to the total amount of the overcoat liquid, and
   a content of the water-soluble organic solvent satisfies formula (1) in units of mass %:

$$0.7 \times A + 0.8 \times B + C < 20 \quad (1)$$

A: a content of a water-soluble organic solvent having a boiling point of 200° C. or lower relative to the total amount of the overcoat liquid,
   B: a content of a water-soluble organic solvent having a boiling point of higher than 200° C. and 250° C. or lower relative to the total amount of the overcoat liquid, and
   C: a content of a water-soluble organic solvent having a boiling point of higher than 250° C. relative to the total amount of the overcoat liquid,
   wherein a ratio of the content of the particles of the anionic polyurethane to the content of the particles of the wax is 25 to 50 on a mass basis.

2. The overcoat liquid for inkjet textile printing according to claim 1, wherein the anionic polyurethane has a carboxy group.

3. The overcoat liquid for inkjet textile printing according to claim 1, wherein the anionic polyurethane has a carbonate structure.

4. The overcoat liquid for inkjet textile printing according to claim 1, wherein the wax is a polyethylene wax.

5. The overcoat liquid for inkjet textile printing according to claim 1, wherein the water-soluble organic solvent is a glycol compound.

6. The overcoat liquid for inkjet textile printing according to claim 1, further comprising a crosslinking agent.

7. The overcoat liquid for inkjet textile printing according to claim 6, wherein the crosslinking agent is a blocked isocyanate.

8. The overcoat liquid for inkjet textile printing according to claim 1, further comprising, as a thickener, a polyethylene glycol having a weight-average molecular weight of 4000 or more, or a block polymer formed from a polyethylene glycol and a polypropylene glycol that have a weight-average molecular weight of 4000 or more.

9. The overcoat liquid for inkjet textile printing according to claim 8, wherein a content of the thickener is 0.01 mass % to 2 mass % relative to the total amount of the overcoat liquid.

10. An ink set for inkjet textile printing, comprising:
   the overcoat liquid for inkjet textile printing according to claim 1; and
   a color ink.

11. An inkjet textile printing method comprising:
   jetting a color ink onto a fabric by an inkjet recording method; and
   jetting, by an inkjet recording method, the overcoat liquid for inkjet textile printing according to claim 1 onto the fabric onto which the color ink has been jetted.

12. The inkjet textile printing method according to claim 11, wherein in the jetting, by an inkjet recording method, the overcoat liquid for inkjet textile printing, the overcoat liquid for inkjet textile printing is jetted using an inkjet recording apparatus having a liquid circulation mechanism configured to circulate the overcoat liquid for inkjet textile printing between a liquid tank and an inkjet head.

13. The inkjet textile printing method according to claim 11, wherein in the jetting, by an inkjet recording method, the overcoat liquid for inkjet textile printing, the overcoat liquid for inkjet textile printing is jetted by a single pass system.

\* \* \* \* \*